United States Patent
Lee et al.

(10) Patent No.: US 8,093,753 B2
(45) Date of Patent: Jan. 10, 2012

(54) SEQUENTIAL CONTROL MASTER-SLAVE SOCKET DEVICE

(75) Inventors: Yu-Lung Lee, Nanjhuang Township, Miaoli County (TW); Kuo-Tian Cheng, Tucheng (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 150 days.

(21) Appl. No.: 12/585,520

(22) Filed: Sep. 17, 2009

(65) Prior Publication Data

US 2010/0295371 A1    Nov. 25, 2010

(30) Foreign Application Priority Data

May 25, 2009  (TW) ................................ 98117279 A

(51) Int. Cl.
*H02J 3/14*     (2006.01)

(52) U.S. Cl. .......................................... 307/41; 307/125
(58) Field of Classification Search .................... 307/38, 307/39, 40, 41, 116, 125; 200/51.04
See application file for complete search history.

(56) References Cited

U.S. PATENT DOCUMENTS

| 6,940,272 | B2 * | 9/2005 | Niv | ................................. 307/31 |
| 7,843,081 | B2 | 11/2010 | Lim | |

FOREIGN PATENT DOCUMENTS

| JP | 02-145786 U | 12/1990 |
| JP | 2009-517835 A | 4/2009 |

* cited by examiner

*Primary Examiner* — Jared Fureman
*Assistant Examiner* — Carlos Amaya
(74) *Attorney, Agent, or Firm* — Rosenberg, Klein & Lee

(57) ABSTRACT

A sequential control master-slave socket device includes at least one master socket, a plurality of slave socket, a plurality of switches, a load judgment device and a controller. Each master socket is coupled to an input power source. Inlet terminals of the switches are coupled to the input power source commonly and outlet terminals of the switches are respectively correspondingly coupled with the slave sockets for controlling whether the input power source is provided for each of the slave sockets. The load judgment device is coupled with each master socket for outputting a control signal according to an electrify state of a load connected with each master socket. The controller is coupled with the load judgment device and each switch to drive the switches one by one in a preset sequence under the control of the control signal.

5 Claims, 8 Drawing Sheets

SEQUENTIAL CONTROL MASTER-SLAVE SOCKET DEVICE

BACKGROUND OF THE INVENTION

1. Field of the Invention

The present invention relates to a sequential control master-slave socket device, and more particularly to a master-slave socket device which can turn on/off power supplies in preset sequences.

2. Description of Related Art

Please refer to FIG. 1 and FIG. 2. Generally, users usually connect relevant electric equipments, for example, a computer host and its interface equipments, or a TV set, a video and audio player and speakers, and so on, with an extension socket group 10. The electric equipments connected with the same extension socket group 10 are relevant in use, for example, only when the computer stays in a work state, the interface equipments work; contrarily, if the computer shuts off, then the interface equipments cannot work.

Thus, when a master load (such as a computer host or a TV set) connected with one power supply socket of the extension socket group 10 starts, it is preferred that relevant equipments connected with other power supply sockets start simultaneously; and when a master load (such as a computer host or a TV set) connected with one power supply socket of the extension socket group 10 shuts off, it is preferred that relevant equipments connected with other power supply sockets shut off. For the reason, a kind of master-slave control extension socket group (not labeled) has been developed for relevant electric equipments in family in order to improve electricity use convenience and fire protection safety and save energy resource consumption.

However, during using a master-slave control extension socket group, when a master load connected with a master socket starts, to turn on periphery electric equipments connected with slave sockets of the extension socket group simultaneously is possible to cause that instantaneous power isn't enough and further shorten component service lives.

SUMMARY OF THE INVENTION

An object of the present invention is to provide a sequential control master-slave socket device which has at least one master socket and a plurality of slave sockets, and when a master load connected with the master socket turns on, the slave sockets will provide power for electric equipments connected with the slave sockets in a preset startup sequence.

To achieve the above-mentioned object, a sequential control master-slave socket device of a first embodiment in accordance with the present invention is provided. The sequential control master-slave socket device includes at least one master socket, a plurality of slave socket, a plurality of switches, a load judgment device and a controller. Each master socket is coupled to an input power source. Inlet terminals of the switches are coupled to the input power source commonly and outlet terminals of the switches are respectively correspondingly coupled with the slave sockets for controlling whether the input power source is provided for each of the slave sockets. The load judgment device includes a detection unit and a judgment unit, wherein the detection unit is coupled with each master socket for detecting a total current value of electric currents flowing through the master sockets and outputting an current signal; and the judgment unit is coupled with the detection unit for comparing the current signal with a default and outputting the control signal. The controller is coupled with the load judgment device and each switch to drive the switches one by one in a preset sequence under the control of the control signal.

To achieve the above-mentioned object, a sequential control master-slave socket device of a second embodiment in accordance with the present invention is further provided. The difference between the sequential control master-slave socket device of the second embodiment and that of the first embodiment is that the load judgment device of the second embodiment includes a detection unit, a transmitting unit and a remote control. The detection unit is coupled with each master socket for detecting a total current value of electric currents flowing through the master sockets and a voltage value of each master socket and outputting a current signal and a voltage signal. The transmitting unit is coupled with the detection unit for encoding the current signal and the voltage signal and outputting a power radio frequency signal. The remote control receives the power radio frequency signal and decodes the power radio frequency signal to produce the current signal and the voltage signal, and the remote control shows the total current value, the voltage value of each master socket and a total consumption power value of the master sockets and compares the current signal with a default to wirelessly output the control signal.

DETAILED DESCRIPTION OF THE PREFERRED EMBODIMENTS

Figure 1:
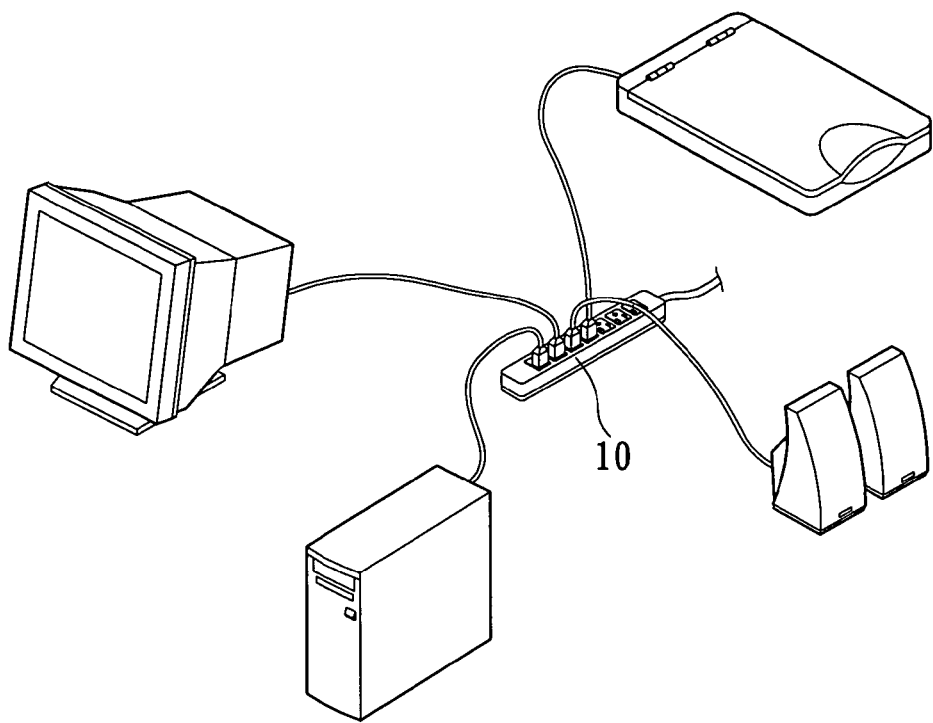
FIG. 1 is a schematic view of a conventional extension socket group connected with relevant electric equipments.
Figure 2:
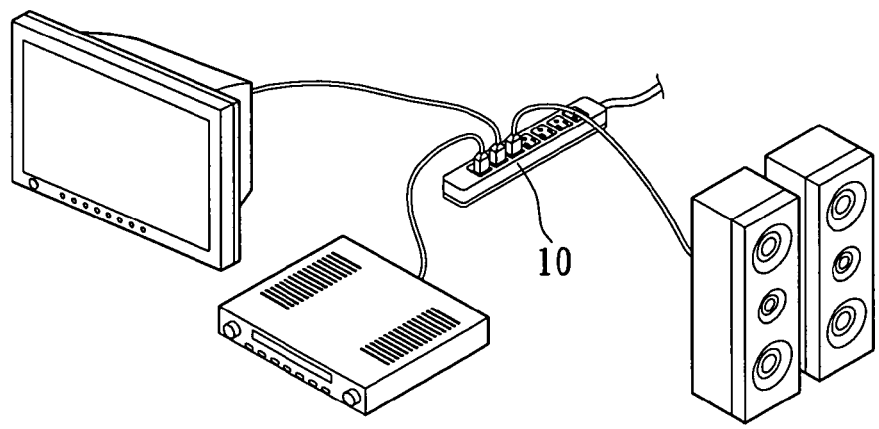
FIG. 2 is another schematic view of a conventional extension socket group connected with relevant electric equipments.
Figure 3:
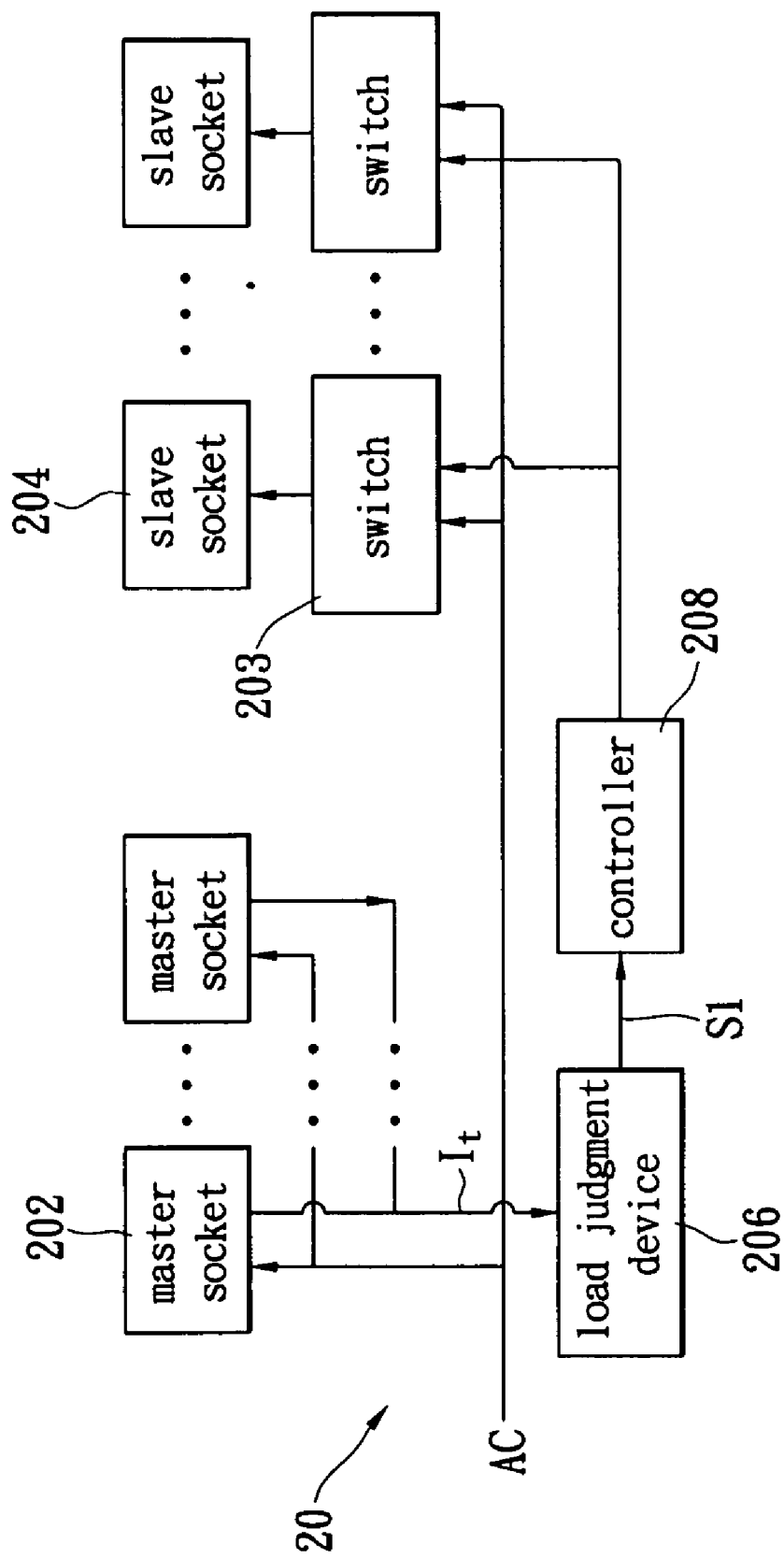
FIG. 3 is a circuit block diagram of the present invention.

Please refer to FIG. 3 illustrating a circuit block diagram of a sequential control master-slave socket device according to the present invention. The sequential control master-slave socket device 20 includes at least one master socket 202, a plurality of slave socket 204, a plurality of switches 203, a load judgment device 206 and a controller 208. Each master socket 202 is coupled to an input power source AC. Inlet terminals (not labeled) of the switches 203 are coupled to the input power source AC commonly, and outlet terminals (not shown) thereof are respectively correspondingly coupled with the slave sockets 204, so that the switches 203 can control whether the input power source AC is provided for each of the slave sockets 204 or not.

Please refer to FIG. 3 again. The load judgment device 206 is coupled with each master socket 202 for outputting a control signal S1 into the controller 208 according to an electrify state of a load (not labeled) connected with each master socket 202. The controller 208 is coupled with the load judgment device 206 and each switch 203 to drive the switches 203 one by one in a preset sequence under the control of the control signal S1.

Please refer to FIG. 3 again. When the loads connected with the master sockets 202 works, the load judgment device 206 will measure the total current value It of electric currents flowing through the master sockets 202, and output the control signal S1 to enable the controller 208 when the total current value It reaches a default. At this time, the controller 208 executes an internal-set control program to turn on the switches 203 one by one in a preset sequence.

Please refer to FIG. 3 again. When the loads connected with the master sockets 202 enters into a resting state or shuts off and the total current value It of electric currents flowing through the master sockets 202 is below the default, the load judgment device 206 outputs the control signal S1 to disable the controller 208. At this time, the controller 208 executes the internal-set control program to turn off the switches 203 one by one in a preset sequence. The preset sequence for turning off the switches 203 one by one is opposite to the preset sequence for turning on the switches 203 one by one.

Figure 4:
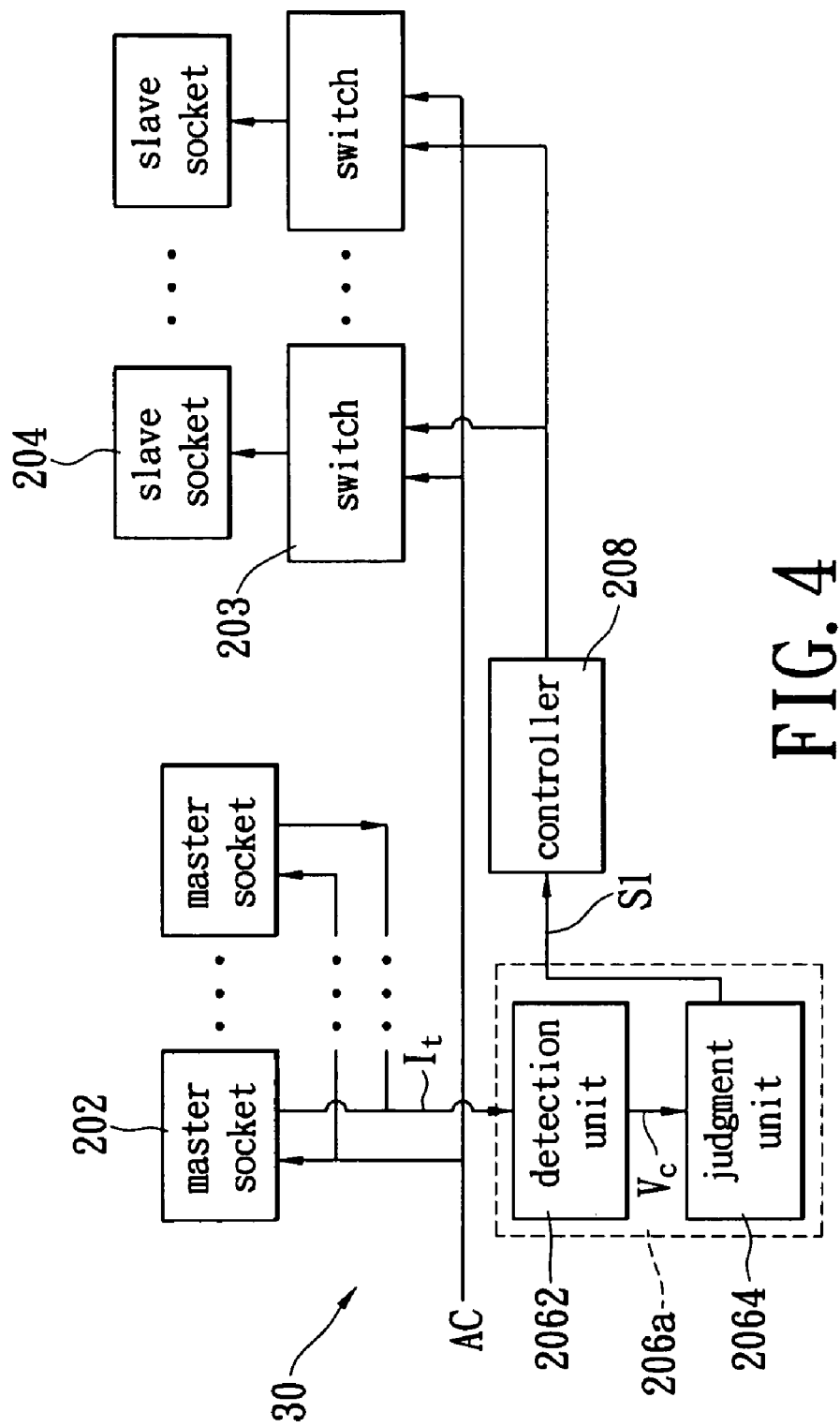
FIG. 4 is a circuit block diagram of a first embodiment of the present invention.

Please refer to FIG. 4, combined with FIG. 3. FIG. 4 is a circuit block diagram of a first embodiment of the present invention. As shown in FIG. 4, the sequential control master-slave socket device 30 of the first embodiment of the present invention has the same master sockets 202, slave sockets 204, switches 203 and controller 208 and connection relationship and functions thereof with the sequential control master-slave socket device 20 as shown in FIG. 3. However, the load judgment device 206a, disclosed in the sequential control master-slave socket device 30 of the first embodiment of the present invention, includes a detection unit 2062 and a judgment unit 2064.

As shown in FIG. 4, the detection unit 2062 is coupled to each master socket 202 for detecting the total current value It of the electric currents flowing through the master sockets 202 and outputting an current signal Vc into the judgment unit 2064 depending on the total current value It. The judgment unit 2064 is coupled with the detection unit 2062 for comparing the current signal Vc with a default (not labeled) and outputting the control signal S1 basing on the compared result.

Accordingly, when the loads on the master sockets 202 work, the detection unit 2062 will measure the total current value It of the electric currents flowing through the master sockets 202 and output the current signal Vc to the judgment unit 2064. At this time, the output current signal Vc is above the default (not labeled), the judgment unit 2064 outputs the control signal S1 to enable the controller 208 and further control the controller 208 to turn on the switches 203 one by one in a preset sequence.

Furthermore, when the loads connected with the master sockets 202 enter into a resting state or shuts off and the current signal Vc output by the detection unit 2062 is lower than the default (not labeled), the judgment unit 2064 will output the control signal S1 to disable the controller 208 and further control the controller 208 to turn off the switches 203 one by one in a preset sequence. The preset sequence for turning off the switches 203 one by one is opposite to the preset sequence for turning on the switches 203 one by one.

Figure 5:
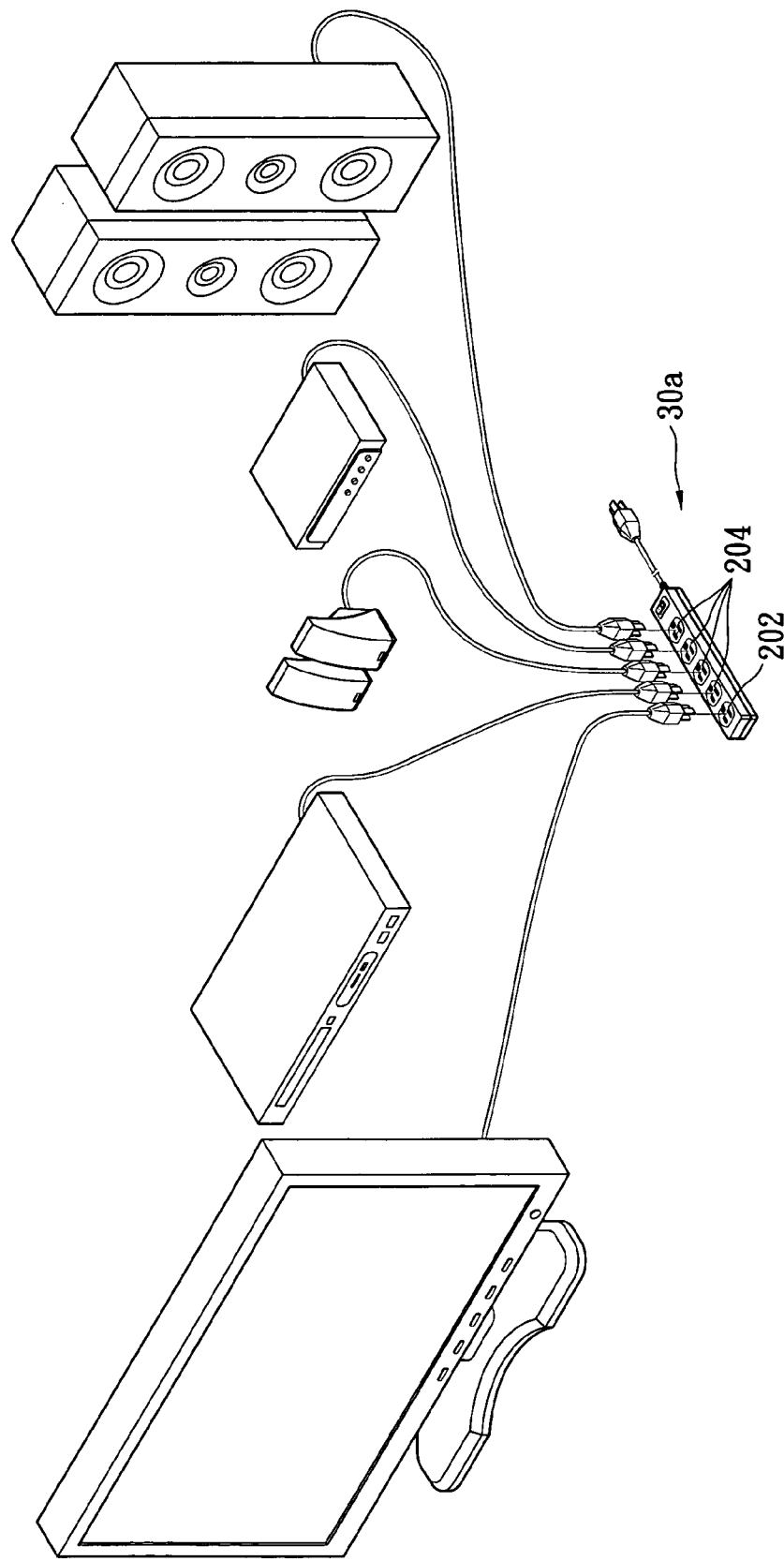
FIG. 5 is a perspective view of the first embodiment of the present invention.

Please refer to FIG. 4, combined with FIG. 5. FIG. 5 is a perspective view of the first embodiment of the present invention. As shown in FIG. 5, the sequential control master-slave socket device 30a has one master socket 202 and four slave sockets 204 interlocked with the master socket 202. According to the relevance of household electrical equipments, during use, the master socket 202 of the sequential control master-slave socket device 30a can be connected with a TV set, and at the same time, the four slave sockets 204 interlocked with the master socket 202 are respectively connected with a DVD player, a loudspeaker, a digital set-top box and a stereo.

Accordingly, when the TV set connected with the master socket 202 starts and an enough current flows through the TV set, the four slave sockets 204 are respectively electrified according to system setting. At this time, the DVD player, the loudspeaker, the digital set-top box and the stereo connected with the four slave sockets 204 will start in turn. Moreover, when the TV set is in a resting or an idle state, the four slave sockets 204 shut off in a sequence opposite to the startup sequence.

Figure 6:
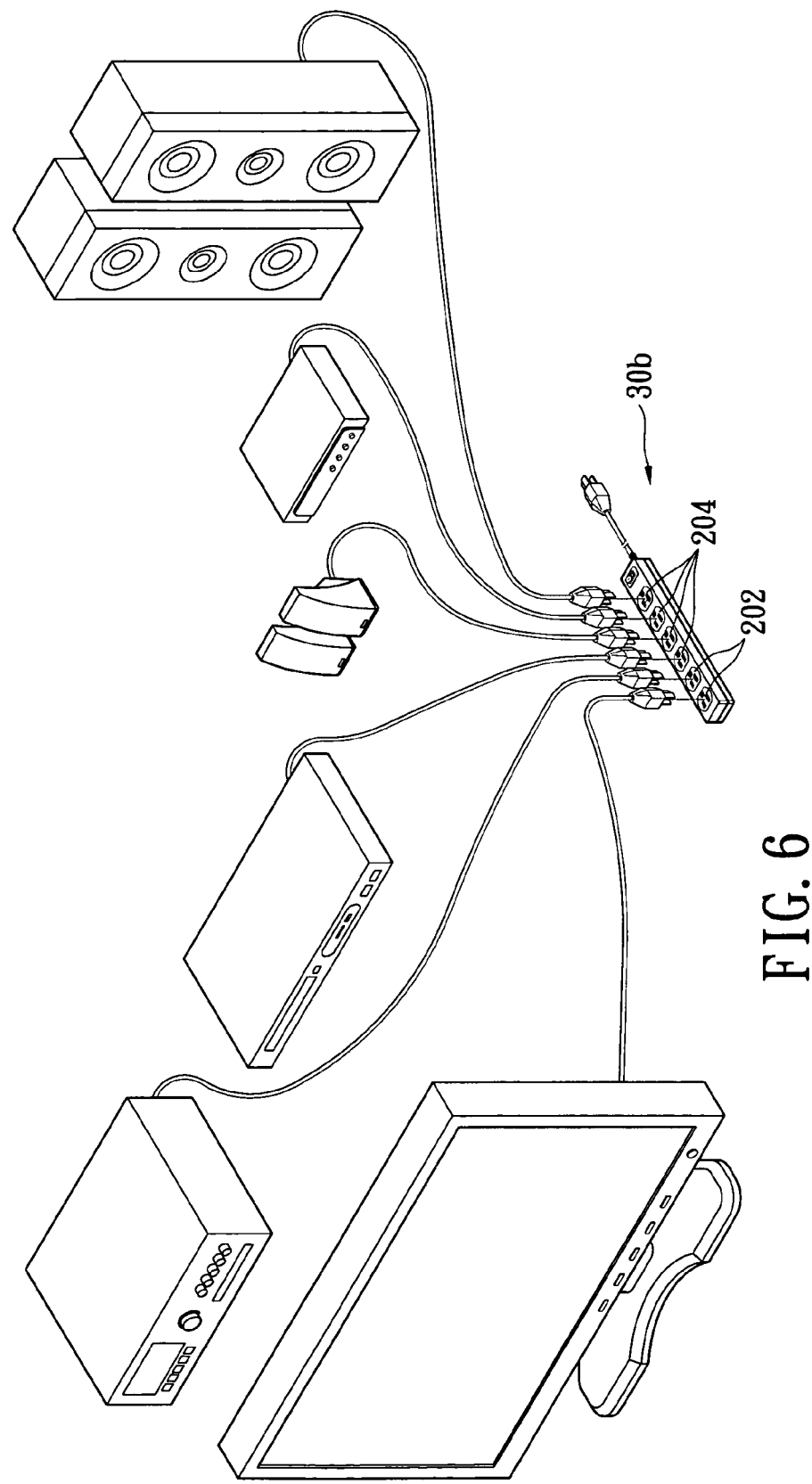
FIG. 6 is another perspective view of the first embodiment of the present invention.

Please refer to FIG. 6, combined with FIG. 4. FIG. 6 is another perspective view of the first embodiment of the present invention. As shown in FIG. 6, the sequential control master-slave socket device 30b has two master sockets 202 and four slave sockets 204 interlocked with the two master sockets 202. According to the relevance of household electrical equipments, during use, the two master sockets 202 of the sequential control master-slave socket device 30b can be connected with a TV set and a stereo player, respectively. At the same time, the four slave sockets 204 interlocked with the two master sockets 202 are respectively connected with a DVD player, a loudspeaker, a digital set-top box and a stereo.

Therefore, when one of the TV set and the stereo player or both of them start and enough currents flow through them, the four slave sockets 204 are respectively electrified according to system setting. At this time, the DVD player, the loudspeaker, the digital set-top box and the stereo connected with the four slave sockets 204 will start in turn. Moreover, when the TV set and the stereo player stay in a resting or an idle state simultaneously, the four slave sockets 204 shut off in a sequence opposite to the startup sequence.

Figure 7:
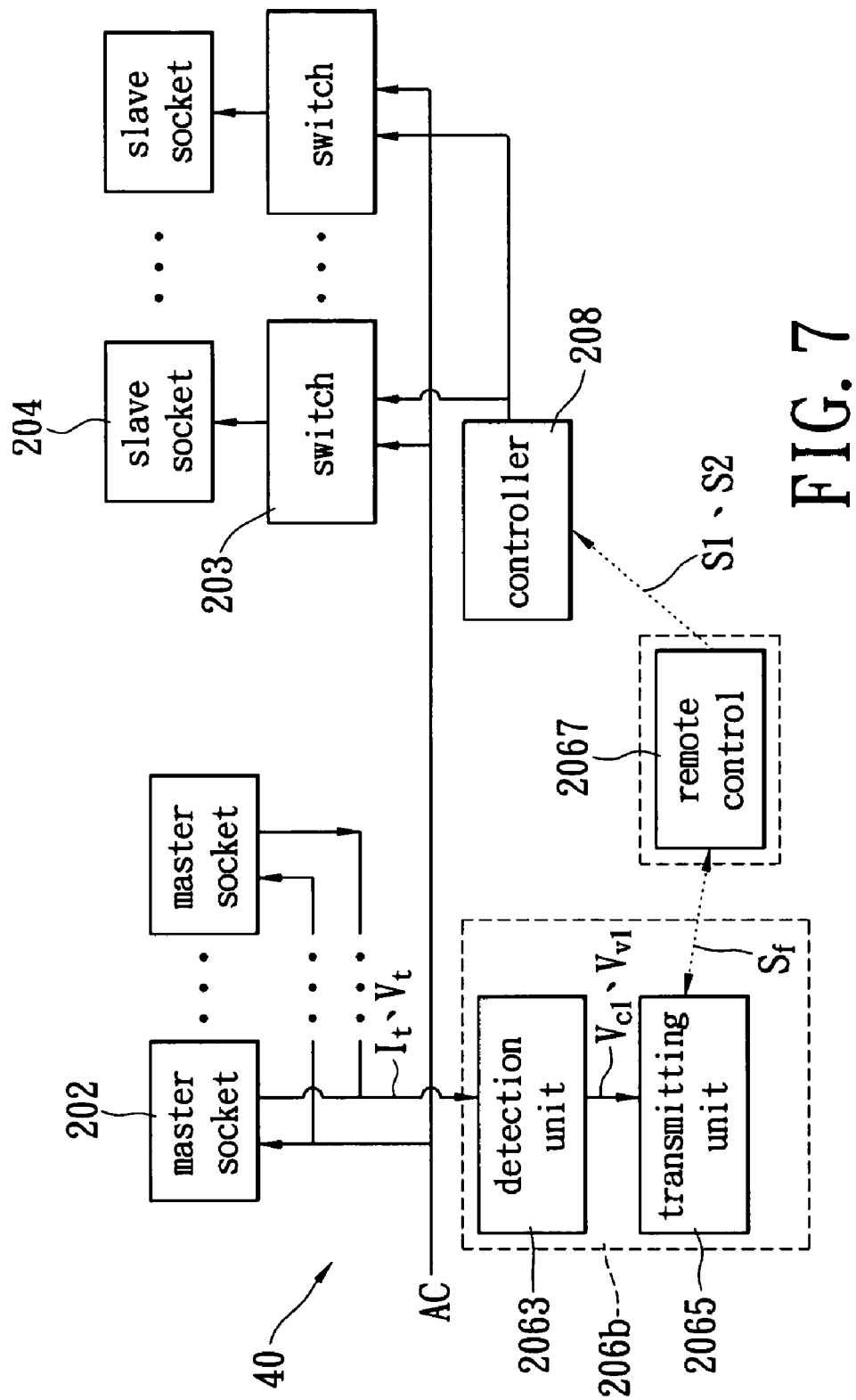
FIG. 7 is a circuit block diagram of a second embodiment of the present invention.

Please refer to FIG. 7, combined with FIG. 3. FIG. 7 is a circuit block diagram of a second embodiment of the present invention. As shown in FIG. 7, the sequential control master-slave socket device 40 of the second embodiment of the present invention has the same master sockets 202, slave sockets 204, switches 203 and controller 208 and connection relationship and functions thereof with the sequential control master-slave socket device 20 as shown in FIG. 3. However, the load judgment device 206b, disclosed in the sequential control master-slave socket device 40 of the second embodiment of the present invention, includes a detection unit 2063, a transmitting unit 2065 and a remote control 2067.

Please refer to FIG. 7 again. The detection unit 2063 is coupled with each master socket 202 for detecting the total current value It of electric currents flowing through the master sockets 202 and a voltage value Vt of each master socket 202 and outputting an current signal Vc1 and a voltage signal Vv1 according to the total current value It and the voltage value Vt of each master socket 202. The transmitting unit 2065 is coupled with the detection unit 2063 for receiving and encoding the current signal Vc1 and the voltage signal Vv1 to output a power radio frequency signal Sf into the remote control 2067. After receiving the power radio frequency signal Sf, the remote control 2067 decodes the power radio frequency signal Sf to recover the current signal Vc1 and the voltage signal Vv1.

The remote control 2067 calculates the above-mentioned current signal Vc1 and voltage signal Vv1, and shows the total current, the voltage value of each master socket 202 and the total consumption power value of the master sockets 202 on a screen (not labeled) of the remote control. At the same time, the remote control 2067 compares the current signal Vc1 with an internal predetermined default (not labeled), and further wirelessly outputs the control signal S1 into the controller 208 according to the compared result.

Therefore, when the loads on the master sockets 202 start, the detection unit 2063 detects the total current value It of the electric currents flowing through the master sockets 202 and outputs the current signal Vc into the transmitting unit 2065, and then the transmitting unit 2065 transmits the current signal Vc1 to the remote control 2067 based on radio frequency technologies. When the current signal Vc1 is above the default of the remote control 2067, the remote control 2067 wirelessly transmits the control signal S1 to the controller 208 to enable the controller 208, thereby controlling the controller 208 to turn on the switches 203 one by one in a preset sequence. Furthermore, the remote control 2067 may also adjust the default based on users' operation.

Additionally, when the loads connected with the master sockets enter into the resting state or shut off, and the current signal Vc1 detected by the detecting unit 2063 is below the default (not labeled) of the remote control 2067, the remote control 2067 wirelessly transmits the control signal S1 to the controller 208 to disable the controller 208, thereby controlling the controller 208 to turn off the switches 203 one by one in a preset sequence. The preset sequence for turning off the switches 203 one by one is opposite to the preset sequence for turning on the switches 203 one by one.

Please refer to FIG. 7 again. The controller 208 has a plurality of kinds of preset sequences, and at the same time, the remote control 2067 may also output a selection signal S2 into the controller 208 for wirelessly controlling the controller 208 to turn on/off the switches 203 one by one in one preset sequence of the plurality of kinds of preset sequences.

Figure 8:
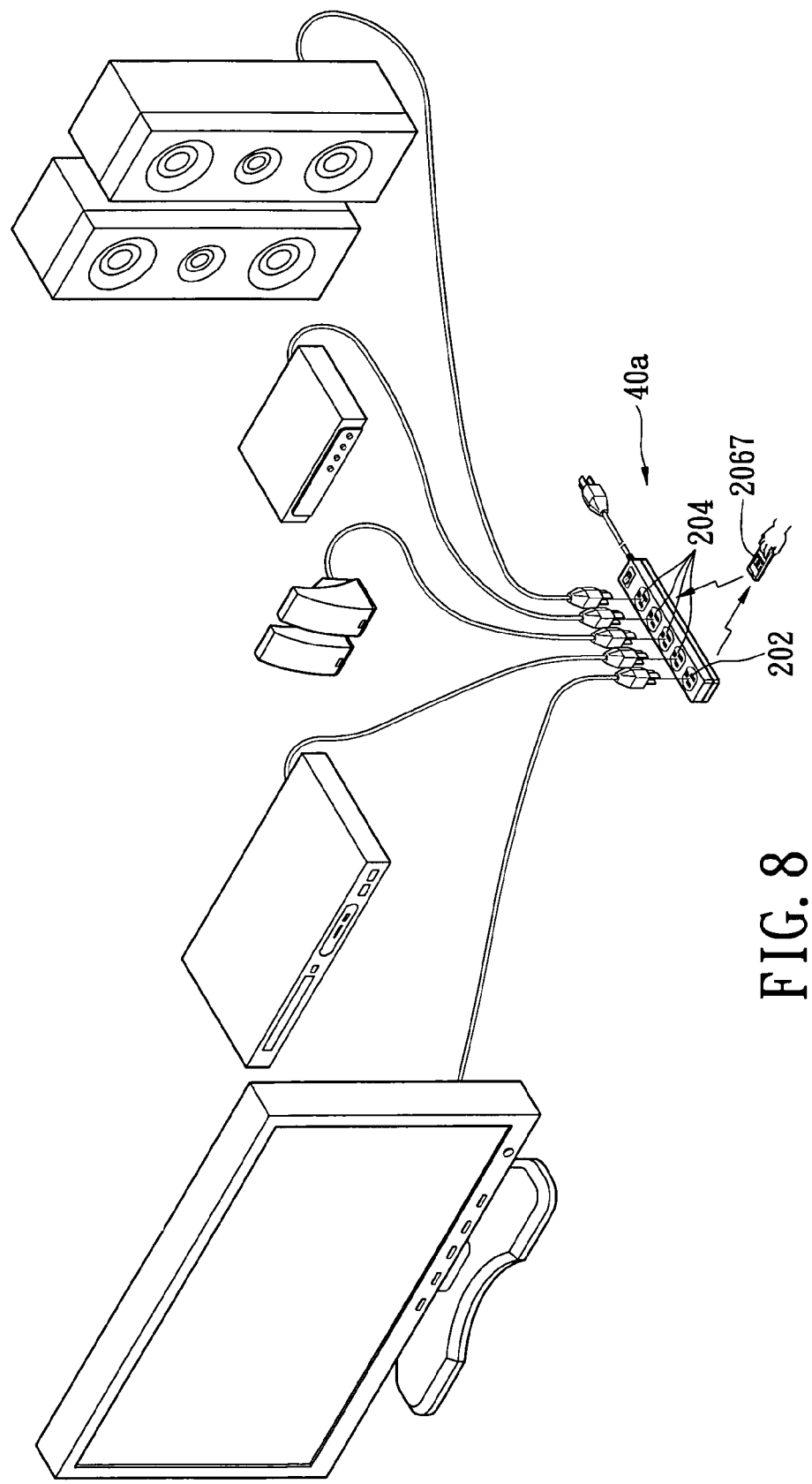
FIG. 8 is a perspective view of the second embodiment of the present invention.

Please refer to FIG. 8, combined with FIG. 7. FIG. 8 is a perspective view of the second embodiment of the present invention. As shown in FIG. 8, the sequential control master-slave socket device 40a has one master socket 202 and four slave sockets 204 interlocked with the master socket 202. According to the relevance of household electrical equipments, during use, the master socket 202 of the sequential control master-slave socket device 40a can be connected with a TV set, and at the same time, the four slave sockets 204 interlocked with the master socket 202 are respectively connected with a DVD player, a loudspeaker, a digital set-top box and a stereo.

Therefore, when the TV set connected with the master socket 202 starts and an enough current flows through the TV set, the remote control 2067 enables the four slave sockets 204 so that the four slave sockets 204 are respectively electrified and turned on in a preset sequence. At this time, the DVD player, the loudspeaker, the digital set-top box and the stereo connected with the four slave sockets 204 will start in turn. Moreover, when the TV set and the stereo player stay in a resting or an idle state simultaneously, the four slave sockets 204 shut off in a sequence opposite to the startup sequence.

Also, users may learn the total current value of the electric current flowing through the master socket 202, the voltage value of the master socket 202 and the total consumption power value of the master socket 202 via the remote control 2067, and further select the preset sequence for turning on/off the four slave sockets 204 via the remote control 2067.

Figure 9:
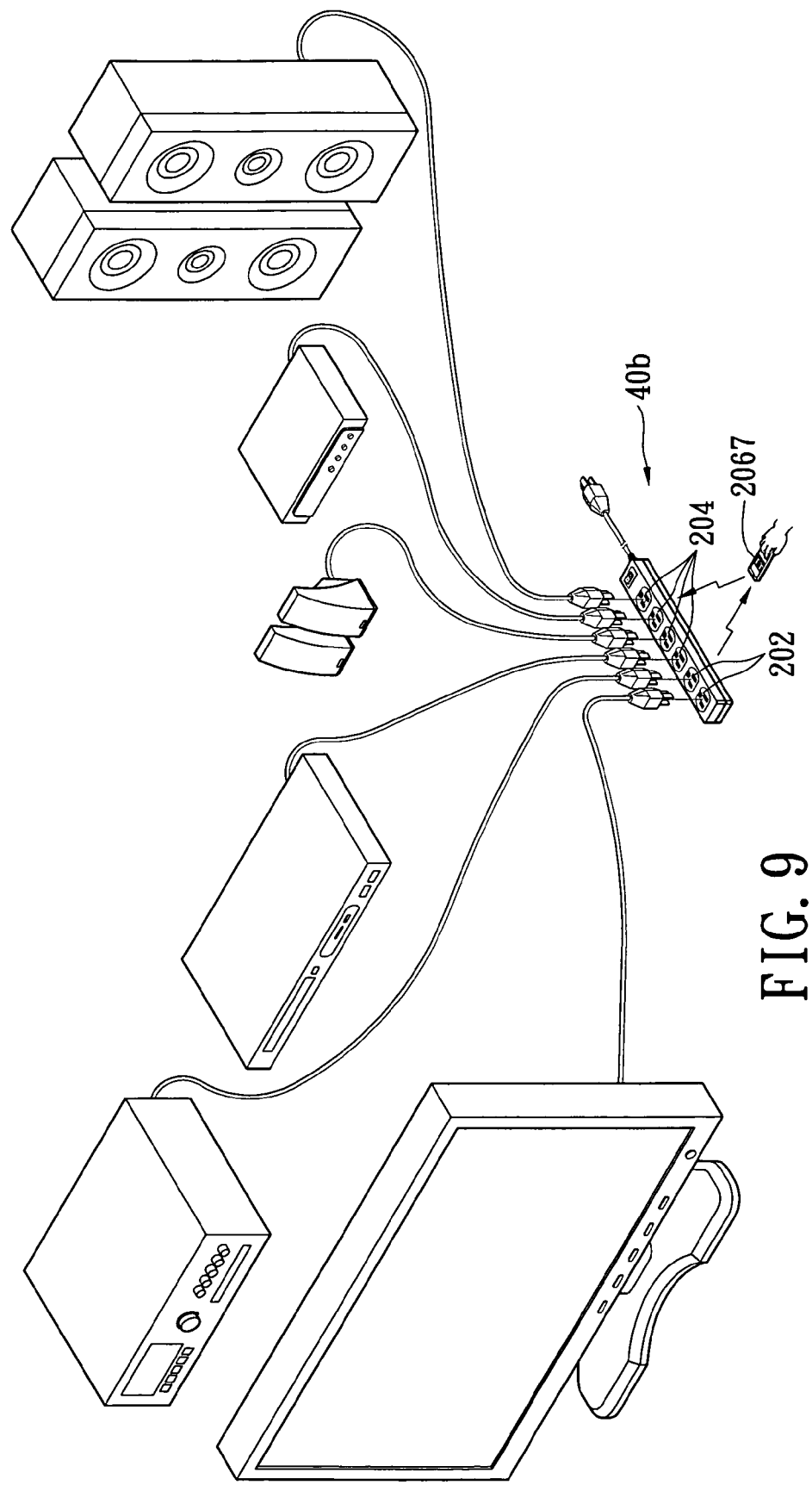
FIG. 9 is another perspective view of the second embodiment of the present invention.

Additionally, please refer to FIG. 9, combined with FIG. 7. FIG. 9 is another perspective view of the second embodiment of the present invention. As shown in FIG. 9, the sequential control master-slave socket device 40b has two master sockets 202 and four slave sockets 204 interlocked with the two master sockets 202. According to the relevance of household electrical equipments, during use, the two master sockets 202 of the sequential control master-slave socket device 30b can be connected with a TV set and a stereo player, respectively. At the same time, the four slave sockets 204 interlocked with the two master sockets 202 are respectively connected with a DVD player, a loudspeaker, a digital set-top box and a stereo.

Therefore, when one of the TV set and the stereo player or both of them start and enough currents flow through them, the remote control 2067 enables the four slave sockets 204 so that the four slave sockets 204 are respectively electrified and turned on according to a preset sequence. At this time, the DVD player, the loudspeaker, the digital set-top box and the stereo connected with the four slave sockets 204 will start in turn. Moreover, when the TV set and the stereo player stay in a resting or an idle state simultaneously, the four slave sockets 204 shut off in a sequence opposite to the startup sequence.

Also, users may learn the total current value of the electric currents flowing through the two master sockets 202, the voltage values of the two master sockets 202 and the total consumption power value of the two master sockets 202 via the remote control 2067, and further select the preset sequence for turning on/off the four slave sockets 204 via the remote control 2067.

What are disclosed above are only the specification and the drawings of the preferred embodiments of the present invention and it is therefore not intended that the present invention be limited to the particular embodiments disclosed. It will be understood by those skilled in the art that various equivalent changes may be made depending on the specification and the drawings of the present invention without departing from the scope of the present invention.

What is claimed is:

1. A sequential control master-slave socket device, comprising:
    at least one master socket, each coupled to an input power source;
    a plurality of slave sockets;
    a plurality of switches, inlet terminals of the switches coupled to the input power source jointly and outlet terminals of the switches respectively coupled with the slave sockets for controlling whether the input power source is provided for each of the slave sockets;
    a load judgment device, comprising:
        a detection unit, coupled with each master socket, for detecting a total current value of electric currents flowing through the master socket and a voltage value of the master socket and outputting an current signal and a voltage signal;
        a transmitting unit, coupled with the detection unit, for encoding the current signal and the voltage signal and outputting a power radio frequency signal; and
        a remote control for receiving the power radio frequency signal and decoding the power radio frequency signal to prepare the current signal and the voltage signal, the remote control presenting the total current value and the voltage value of the master socket, and a total consumption power value of the master socket, and comparing the current signal with a default before wirelessly output the control signal; and
    a controller, coupled with the load judgment device and each switch to drive the switches one by one in a preset sequence according to the control signal;
    wherein when the total current value of the electrical currents flowing through the master socket is above the default, the remote control wirelessly controls the controller to turn on the switches one by one in the preset sequence; otherwise, the remote control wirelessly controls the controller to turn off the switches one by one in the preset sequence.

2. The sequential control master-slave socket device as claimed in claim 1, wherein the load judgment device includes:
   a judgment unit, coupled with the detection unit for comparing the current signal with the default and outputting the control signal.

3. The sequential control master-slave socket device as claimed in claim 2, wherein when the total current value is above the default, the judgment unit controls the controller to turn on the switches one by one in the preset sequence.

4. The sequential control master-slave socket device as claimed in claim 3, wherein when the total current value is below the default, the judgment unit controls the controller to turn off the switches one by one in the preset sequence.

5. The sequential control master-slave socket device as claimed in claim 1, wherein the controller has a plurality of the preset sequences, and the remote control outputs a selection signal into the controller for wirelessly controlling the controller to turn on/off the switches one by one in one of the preset sequences.

* * * * *